Sept. 17, 1968    N. H. CRAWFORD    3,402,000
FIBER OPTICAL IMAGE ENLARGER
Filed Sept. 10, 1964

INVENTOR.
Norman H. Crawford
BY
Attorneys

United States Patent Office 3,402,000
Patented Sept. 17, 1968

3,402,000
FIBER OPTICAL IMAGE ENLARGER
Norman H. Crawford, 830 Escondido Road,
Stanford, Calif. 94305
Filed Sept. 10, 1964, Ser. No. 395,526
5 Claims. (Cl. 350—96)

ABSTRACT OF THE DISCLOSURE

A fiber optical image enlarger including a first optical fiber wedge for expanding an image in a first dimension and a second optical fiber wedge for expanding the image in a second dimension perpendicular to the first dimension, the second optical fiber wedge being coupled to the first wedge and having an input image receiving surface corresponding to the expanded output surface of the first wedge. Particular deflection layers are disclosed for coupling the image from the first to the second wedge and to a diffused viewing screen.

---

This invention relates generally to optical image enlargers utilizing fiber optic image forming means and more particularly to such enlargers which provide magnification of optical images in two directions.

Previous devices have provided image enlargements by utilizing bundles of optical fibers. Such devices have been formed in which the optical fibers have each been shaped into tapered cones, light rays being passed from the small end to the large end to achieve magnification. Generally, the tapered cones are formed by heating and pulling a fiber bundle. It is difficult to draw a number of such bundles to achieve a large number of cones of uniform size. Nonuniformity of the cones in a given device results in image distortion.

Enlargement or magnification of a sort has also been produced by cutting a bundle of optical fibers at a bias and redirecting the emergent light in the direction normal to the cut to provide magnification in one direction. The fibers have been fanned out in the other direction to provide magnification in that direction. This leaves spaces between the fibers which contain no image information. The spaces are not visible for small fibers. However, this limits fiber diameters and magnification.

Accordingly, it is a general object of my invention to provide a novel optical image magnifier which overcomes the above-mentioned difficulties.

It is also an object of my invention to provide a compact and self-contained optical fiber image magnifier which possesses good optical efficiency and resolution.

It is another object of my invention to provide a fiber optical magnifier of the above character that does not require conventional optical focusing.

It is another object of my invention to provide a fiber optical magnifier of the above character that is easy to manufacture and requires less material than fiber optical devices utilizing tapered fibers.

It is another object of my invention to provide a fiber optical magnifier of the above character with an image screen which can be uniformly illuminated from a single source.

It is another object of my invention to provide a fiber optical magnifier of the above character which is free from optical distortion and which can expand an image equal amounts in two perpendicular directions or which can correct linear distortion by expanding an image unequal amounts in two perpendicular directions as desired.

Additional objects and features of my invention will be apparent from the following description of the several embodiments of my invention. The novel features thereof will be particularly pointed out hereinafter in connection with the appended claims and the accompanying drawings of which:

Generally, my invention provides for the expansion of a light image in two directions independently and successively thereby producing a magnified image. To this end, a pair of unequal wedges constructed of optical fibers are joined by a light deflecting layer. The second wedge terminates in a light deflecting layer. The light images are caused to pass through the first wedge and are expanded in one direction by the first wedge. The light rays are deflected by a first deflecting layer to form an intermediate partially enlarged image and redirected into a second wedge. The second wedge expands the light image in a direction perpendicular to the expansion provided by the first wedge. The light rays are deflected by a second deflecting layer to form the magnified image.

Figure 1:
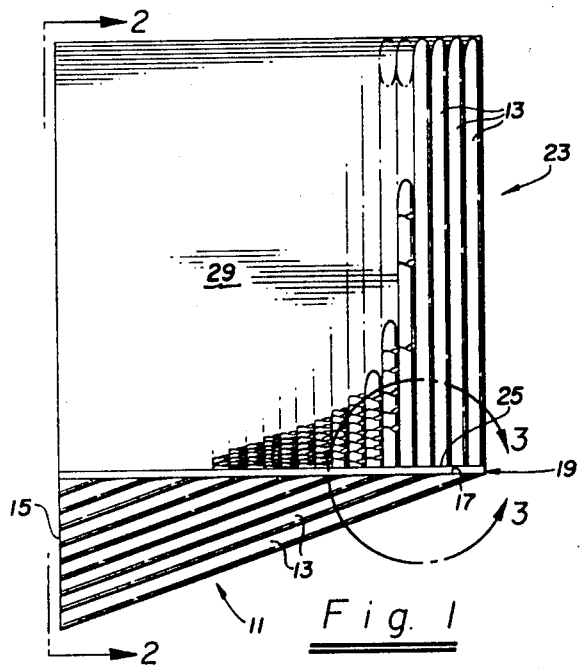
FIGURE 1 is a front elevational view of a magnifier constructed according to my invention as viewed from the output or screen side.
Figure 2:
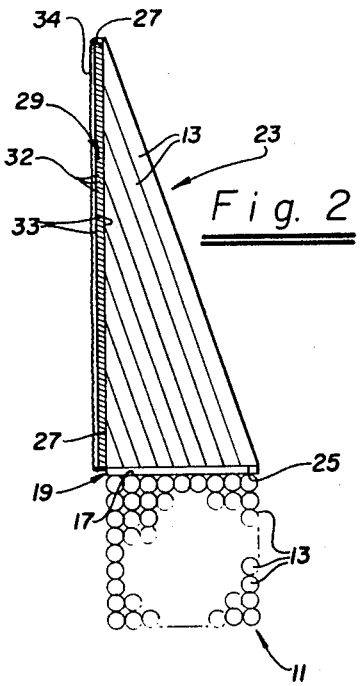
FIGURE 2 is a cross-section view of the magnifier shown in FIGURE 1 taken from the lines 2—2.

More particularly, referring to FIGURES 1 and 2, means is provided for expanding a light image in a first dimension and consists of a wedge 11 constructed of light conducting fibers 13. The fibers 13 are generally aligned side by side and terminate in a light image receiving surface 15 at one side, and a light image transmitting surface 17 at another side. As shown in the drawing and as will be explained hereinafter in connection with magnification, the direction of alignment of the fiber 13 is nearly perpendicular to the image receiving surface 15 and generally oblique to the image transmitting or intermediate output surface 17.

Optical fibers suitable for use in my invention may be chosen from any of the conventional optical fibers now available such as fibers generally having a high refractive index center and a low refractive index surrounding portion. One suitable optic fiber can consist of a flint glass fiber center of about 50 microns diameter in cross-section and a coating of a layer of crown glass of about 5 to 10 microns thickness. Other fibers such as those made of plastic are also suitable. A bundle of fibers may be formed by using plastic or glass fibers of high refractive index embedded in a filler of low refractive index.

Means is provided for redirecting the light rays from the direction generally defined by the longitudinal direction of the fibers 13 to a direction normal to the first wedge output surface 17. Such means may comprise a first deflecting layer 19. The deflecting layer may comprise generally aligned side by side plates 21 having generally parallel input and output surfaces 22 for receiving and transmitting light rays. The plates are positioned at an angle to the normal of the receive and transmit surfaces of the deflecting layer 19. The preferred angles for the construction of the wedges and reflecting layers will be discussed hereinafter in connection with an explanation of the operation of my invention and with FIGURE 3.

Means is provided for magnifying the light image in a direction normal to the direction of first magnification and consists of a second wedge 23 constructed of light conductive fibers 13. The fibers 13 are generally aligned side by side and terminate in a light image receiving intermediate input surface 25 at one side and a light image transmitting surface 27 at another side. Again, like the first wedge, for image magnification, it is especially convenient to arrange the fiber 13 to be nearly perpendicular to the image receiving surface 25, and generally oblique to the image transmitting surface 27.

Means is provided for redirecting the light rays from the directions generally defined by the longitudinal dimension of the fibers 13 of the second wedge 23 to a direction normal to the second wedge output surface 27 and consists of a second deflecting layer 29. The layer 29 is constructed similar to layer 19 and consists of generally aligned side by side optical plates 32 formed to provide surfaces 33 for receiving and transmitting a light image. The surfaces are generally parallel and spaced apart. The layer 29 terminates in a surface 34 for diffusing light rays for viewing.

The operation of a light image magnifier constructed according to my invention will now be described.

Figure 3:
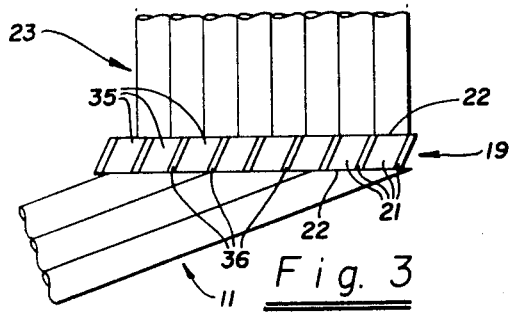
FIGURE 3 is an enlarged fragmentary cross-section view taken along the line 3—3 of FIGURE 1.

Referring to FIGURES 1–3, the longitudinal axis of the optical fibers and the normal to the input surface of the first wedge make an angle $\theta_i$; similarly, the axis of the fibers makes an angle $\theta_0$ with the normal to the output surface of the first wedge. The magnification of the first wedge, $M_1$, in the direction of enlargement is the ratio of the areas of the input and output surfaces respectively, $M_1$=output area/input area. This ratio depends entirely upon the angles $\theta_i$ and $\theta_0$ and is easily seen to be $$\cos \theta_i / \cos \theta_0 = M_1$$

Therefore, the intermediate light image formed by the first wedge is magnified by the factor $M_1$ in one dimension.

The input surface of the second wedge has the same surface area as the output surface of the first wedge. Consequently, the size of the second wedge is scaled upwards (in the case of enlargement) by the factor $M_1$. By analogy with the discussion above with respect to the first wedge, the magnification of the second wedge $M_2$ is $\cos \mathfrak{F}_i / \cos \mathfrak{F}_0$ where $\mathfrak{F}_i$ is the angle between the normal of the input surface of the second wedge and the longitudinal axis of the fibers and $\mathfrak{F}_0$ is the angle between the normal of the output surface and the axis. Where uniform magnification is desired, the ratios must be equal to each other, and for this special case the total magnification is equal to $M=M_1=M_2$. For the general case, the magnification is independent along the two dimensions of the optical image and consists of $M_1 = \cos \theta_i / \cos \theta_0$, $M_2 = \cos \mathfrak{F}_i / \cos \mathfrak{F}_0$.

For the particular configurations shown in the figures, the input and output surfaces of each wedge are 90° apart. Under this condition, the input and output angles with respect to the optical fiber of the wedges are related; $\theta_i + \theta_0 = 90°$, $\mathfrak{F}_i + \mathfrak{F}_0 = 90°$, whence $$M_1 = \tan \theta_0$$
$$M_2 = \tan \mathfrak{F}_0$$

There is no necessity to predeflect the light rays into the first wedge provided the direction of the light rays does not differ from the longitudinal axis of the fibers by too great an angle.

Alternatively, the input angle may always be made 90° to the longitudinal axis of the fibers, in which case the treatment given above simplifies to $$M_1 = \sec \theta_0$$
$$M_2 = \sec \mathfrak{F}_0$$

FIGURE 3 shows the detailed construction of the first deflecting layer of FIGURES 1 and 2. The deflecting layer consists of a plurality of optical plates 21 placed side by side and in parallel alignment at approximately 45° to the spaced parallel input and output surfaces 22. The plates 21 are arranged in alternate rows 35 and 36 of high and low refractive index glass to provide internal reflection at the boundaries.

Flint and crown glass, respectively, are suitable high and low index glasses for this purpose. Alternatively, the plates 21 may all be constructed as hereinbefore set forth with respect to fibers 13. Light rays emanating from the ends of the fibers of the first wedge 11 generally are travelling in a direction along the axis of the fibers 13. Upon entering the deflecting layer, the rays are redirected generally toward the longitudinal axis of the fibers of the second wedge and into the second wedge 23. The angle $\alpha$ of the plates 21 to surfaces 22 is made $1\theta_0/2$ to obtain the reflection condition.

Figure 4:
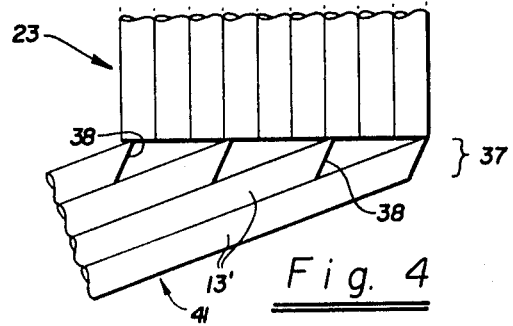
FIGURES 4–6 are enlarged fragmentary cross-section views of other reflecting layers.
Figure 5:
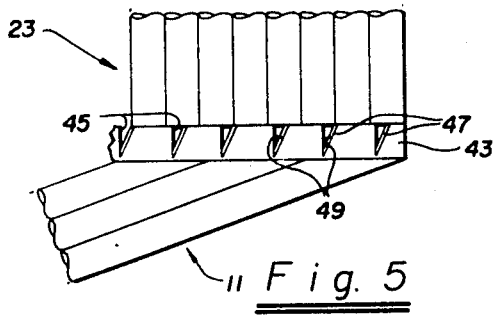
Figure 6:
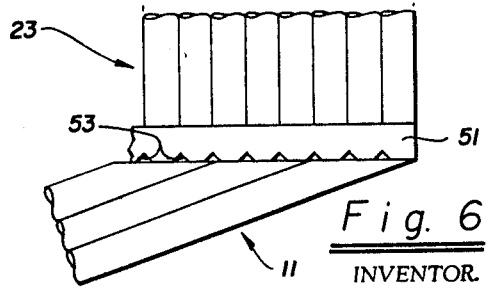

FIGURES 4–6 show alternative embodiments of deflecting layers, such as layers 19 and 29, for use in my invention. FIGURE 4 shows a deflecting layer 37 consisting of the cut ends of the fibers 13' of the wedge 41. Each of the fibers 13' is cut at its end to provide an individual reflecting surface 38 for redirecting the light rays in a direction generally normal to the output surface of the wedge. The surfaces 38 are made so that when the fibers 13' are formed into a wedge, the normal to the surface 38 will bisect the angle between the longitudinal axis of the fibers 13', and the normal to the output surface to provide deflection into the second wedge. This angle is easily seen to be $(90-\theta_0/2)°$. The wedge 41 may be prepared by cutting a fiber optic bundle at the predetermined angle to the longitudinal axis of the fibers and sliding the cut fibers relative to each other so that their tips lie in the desired output surface plane.

FIGURE 5 shows a deflecting layer constructed of a glass plate 43 having a row of V-shaped grooves 45 in the top thereof. The grooves 45 are provided with a highly reflective coating 47 on one face 49 thereof. The face is cut at an angle of approximately $(90-\theta/2)°$ to the surfaces of the plate 43.

Referring now to FIGURE 6, there is shown another construction of a deflecting layer consisting of a plate 51 having a plurality of grooves 53 made therein and running generally normal to the direction of light rays leaving the wedge. Light rays entering the deflection plate and striking the grooves will be deflected to a direction nearly normal to the output surface of the wedge.

While I have shown several examples of suitable deflecting layers, others are easily envisaged. For example, the region of the second wedge next to its input surface may be formed in a generally curved manner so as to form a transition region. In this region, the fibers begin with longitudinal direction aligned to the longitudinal direction of the fibers of the first wedge and as gradually bend to a direction normal to the output surface of the first wedge.

The image enlarger may be used to provide a large area source of illumination from a relatively small source. For example, the image enlarger may be employed in conjunction with an incandescent bulb to provide large illumination. The output deflecting layer may be frosted to provide diffused light.

I have shown several embodiments in the above description and drawings which are illustrative of my invention. I do not intend thereby to limit the scope of my invention except by the following claims.

I claim:

1. A fiber optical image enlarger for expanding a light image comprising a first optical fiber wedge including a first plurality of light conducting fibers of substantially uniform cross section and aligned generally parallel and side by side to form a first fiber bundle, said bundle terminating at one side to form an input surface for receiving light from said image, said input surface being substantially transverse to the longitudinal axis of said fiber bundle, said fiber bundle terminating at another side to form an intermediate output surface at an angle to said input surface, said intermediate output surface being expanded in a predetermined single direction with respect to said input surface, means forming a deflecting layer placed adjacent said intermediate output surface for redirecting light rays therefrom toward a direction normal to said surface, a second optical fiber wedge including a plurality of light conducting fibers of substantially uniform cross section and aligned generally parallel and side by side to form a second fiber bundle, said fiber bundle terminating on one side to form an intermediate input surface for receiving the light from the deflecting layer, said intermediate input surface of said second wedge being formed substantially transversely of a longitudinal axis of said second fiber bundle and having an area corresponding to the area of said intermediate output surface, said fiber bundle terminating at another side to form an output surface at an angle to said intermediate input surface, said output surface being expanded thereby in a single predetermined direction different from said first predetermined direction of expansion and having an area corresponding to the magnification caused by each of said first and second wedges, and second deflecting means placed adjacent said output surface of said second wedge for redirecting light rays toward a direction normal to said second surface.

2. An enlarger as in claim 1 wherein said first direction and said second direction are perpendicular with respect to the dimensions of the light image.

3. An enlarger as in claim 1 in which a second deflecting means includes a pair of spaced parallel surfaces, one of said surfaces being placed adjacent the output surface of the second wedge and the other surface including means for diffusing light rays from passing therethrough.

4. An enlarger as in claim 1 in which said first deflecting means comprises a glass plate having a plurality of spaced apart parallel etched and polished V-shaped grooves thereon.

5. An enlarger as in claim 1 in which said deflecting means consists of a plurality of optical plates placed side by side in parallel alignment at approximately 45° to the intermediate input and output surfaces, said plates being arranged in alternate rows of high and low refractive index.

References Cited

UNITED STATES PATENTS 3,043,910   7/1962   Hicks _____ 350—96 X

OTHER REFERENCES

Strong: "Concepts of Classical Optics," W. H. Freeman and Company, San Francisco, 1958, pages 567–570 relied on.

JOHN K. CORBIN, *Primary Examiner.*